May 12, 1964     W. H. MOORE     3,132,985
PAPERBOARD CORRUGATING APPARATUS AND METHOD
Filed June 16, 1960     4 Sheets-Sheet 1
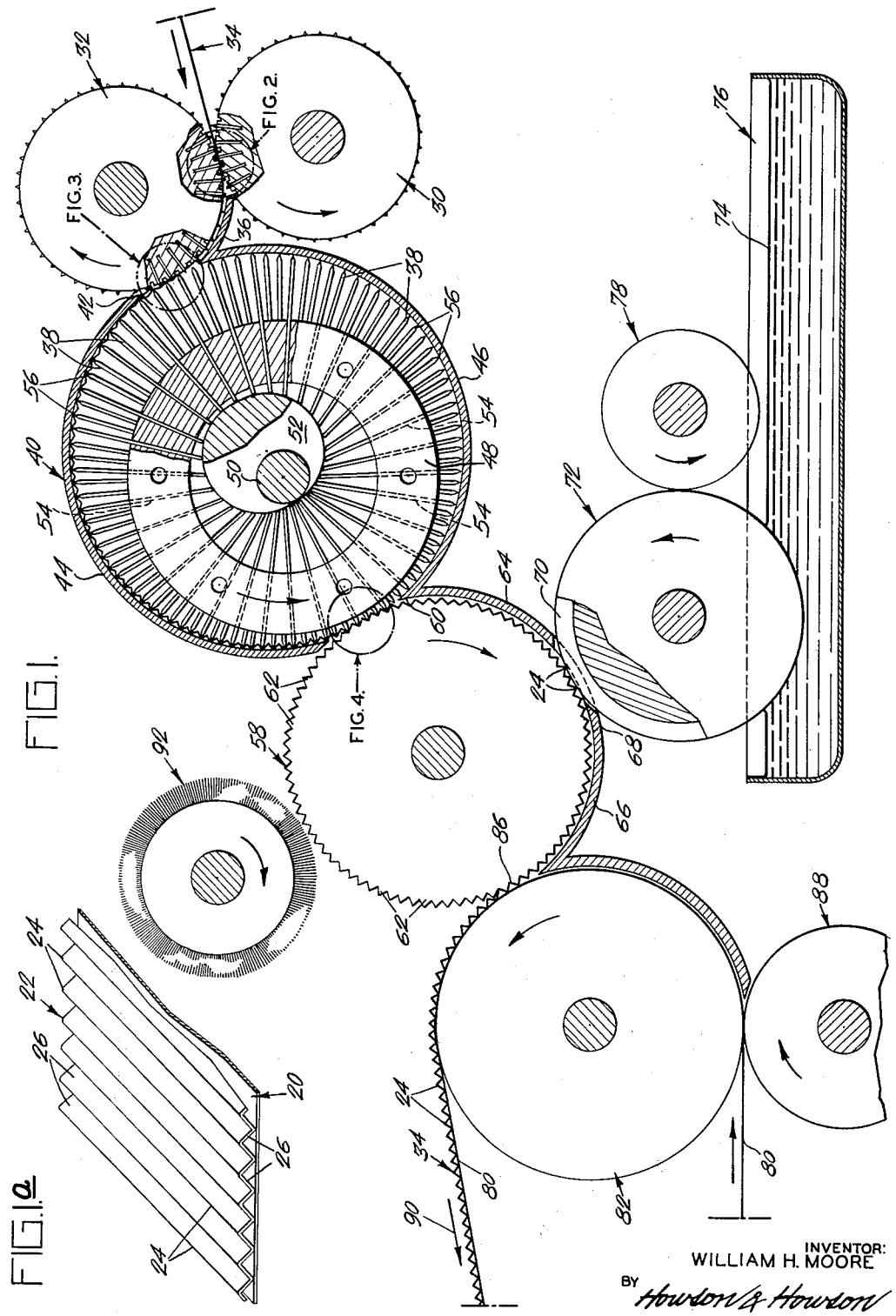
INVENTOR:
WILLIAM H. MOORE
BY Howson & Howson
ATTYS.

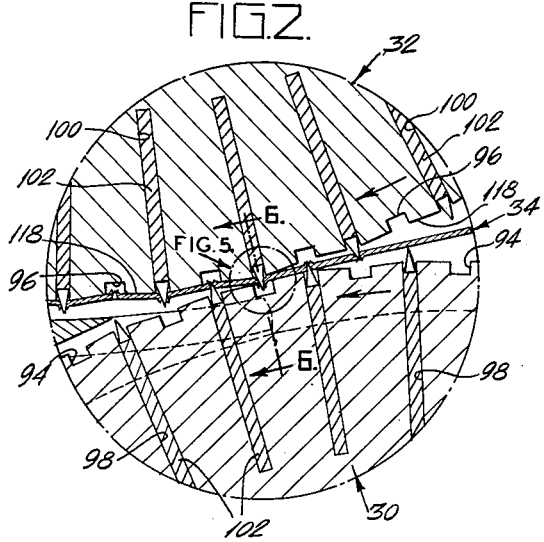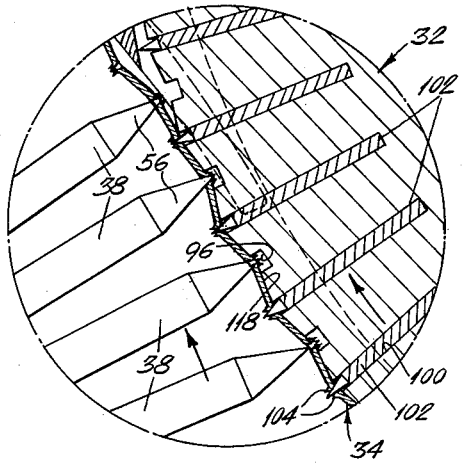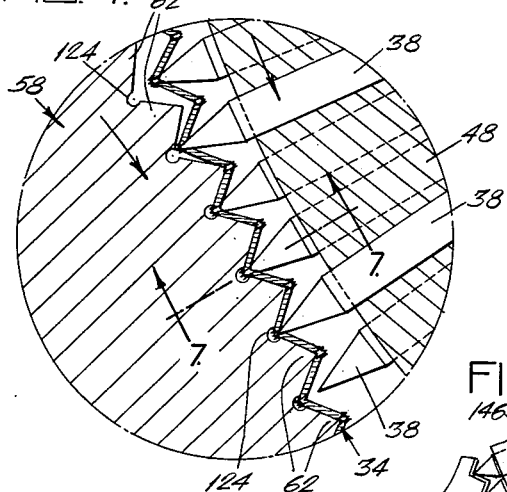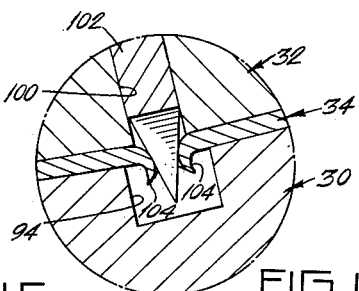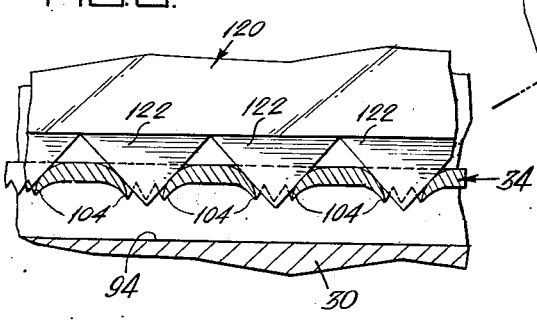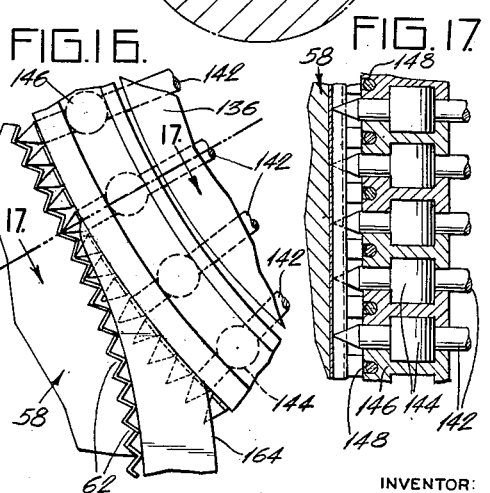

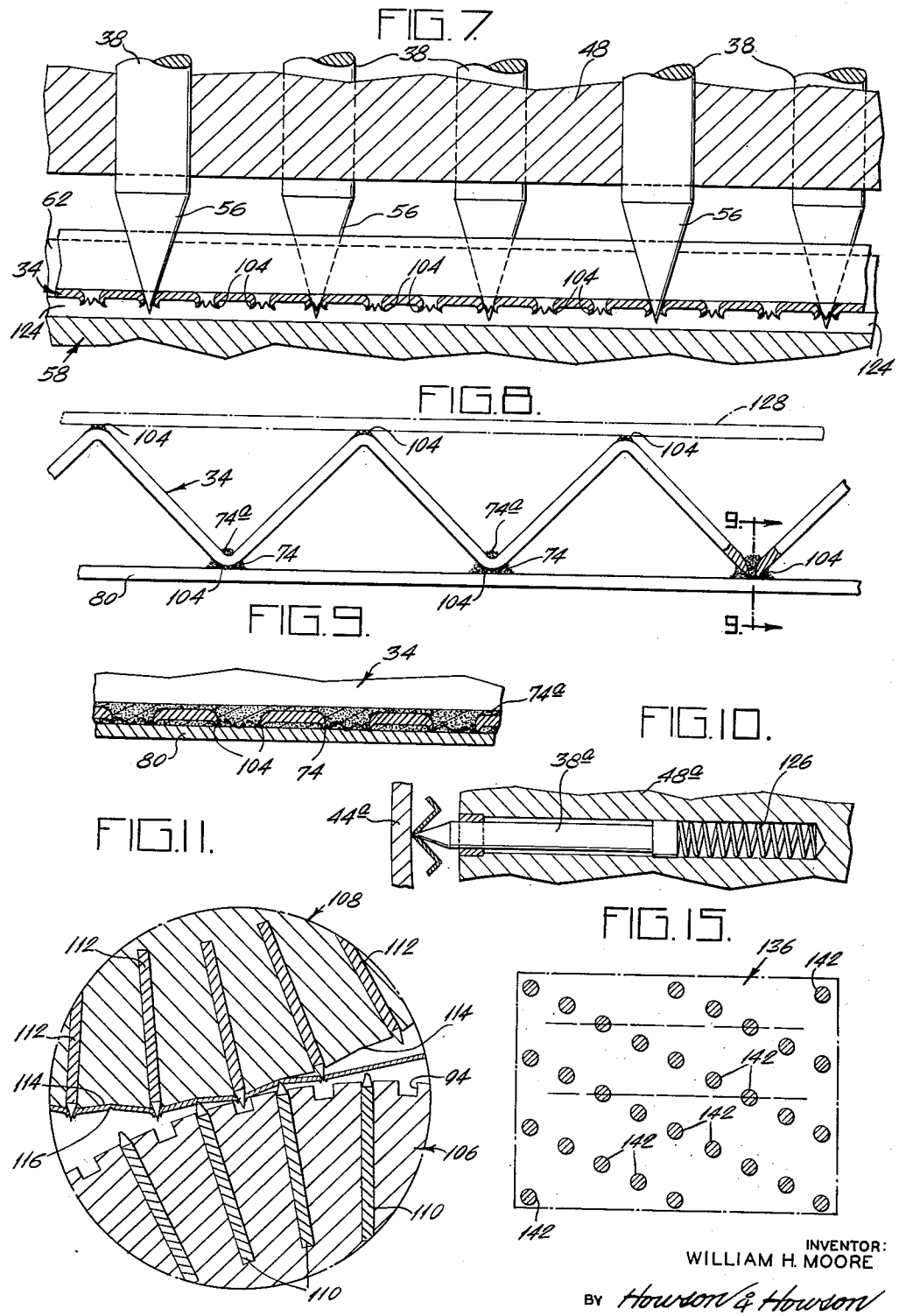

May 12, 1964 W. H. MOORE 3,132,985
PAPERBOARD CORRUGATING APPARATUS AND METHOD
Filed June 16, 1960 4 Sheets-Sheet 4
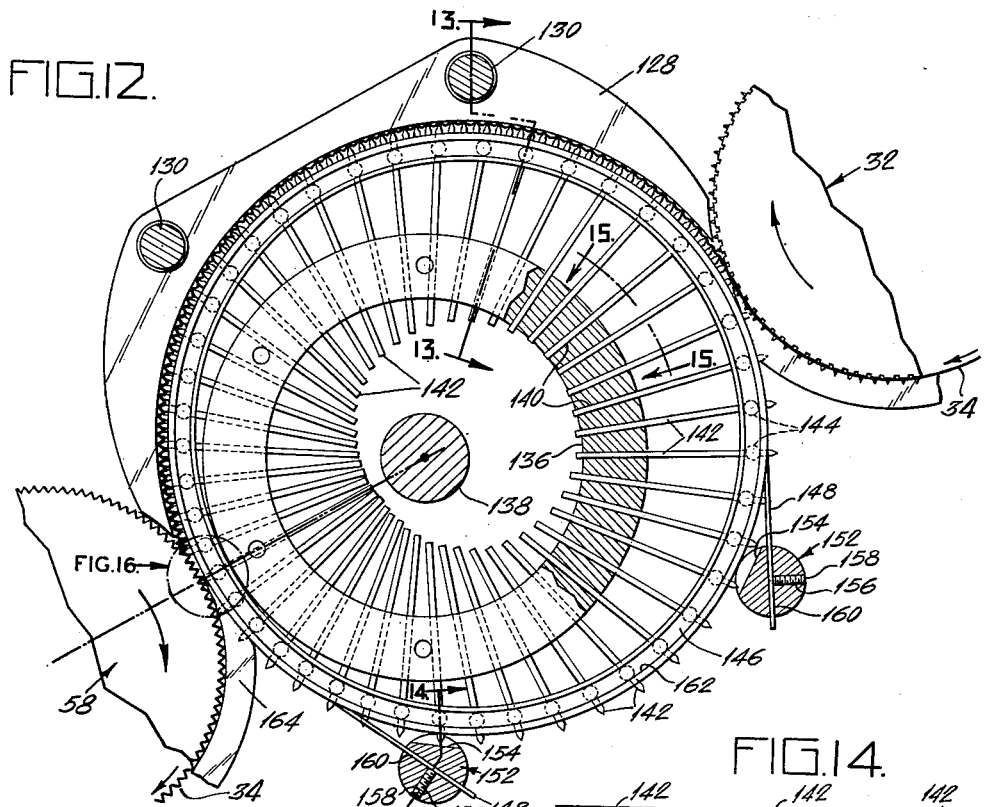
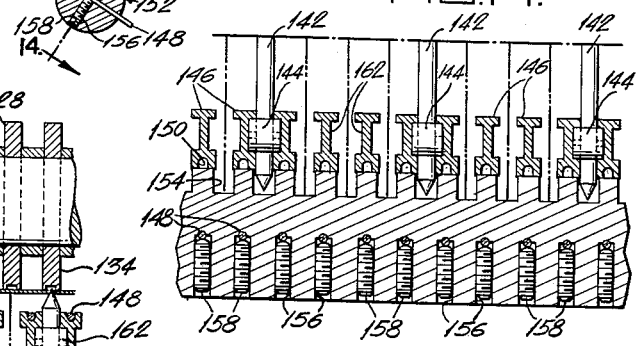
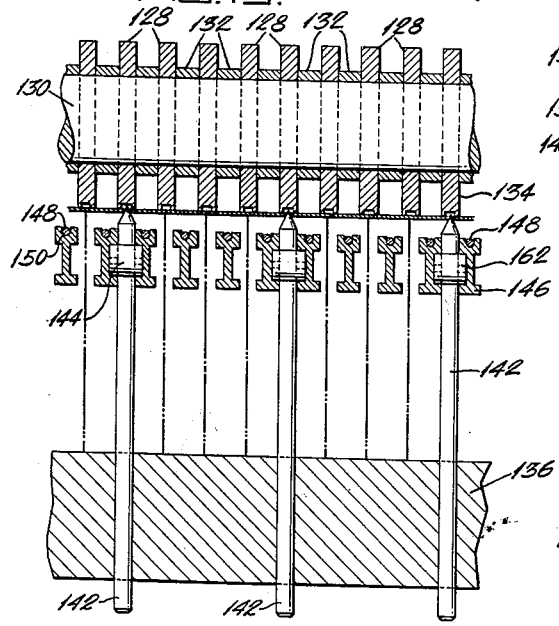
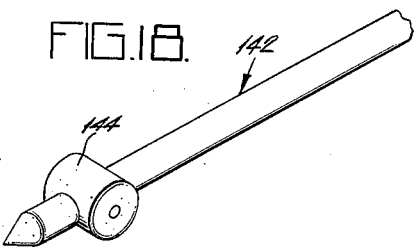
INVENTOR:
WILLIAM H. MOORE
BY Howson & Howson
ATTYS.

3,132,985
Patented May 12, 1964

3,132,985
PAPERBOARD CORRUGATING APPARATUS AND METHOD
William H. Moore, Oreland, Pa., assignor, by mesne assignments, to Crown Zellerbach Corporation, San Francisco, Calif., a corporation of Nevada
Filed June 16, 1960, Ser. No. 36,638
13 Claims. (Cl. 156—342)

The present invention relates broadly to apparatus and a process for manufacturing corrugated paperboard or the like and more particularly to a mechanism for gathering and positioning a continuous web into sharp crested, even, straight-sided corrugations with a smooth continuous motion for transfer into a tooth roll.

In the past and for a considerable period of time, corrugated paperboard generally consisted of an undulated corrugated paperboard medium to which a paperboard liner was adhesively attached at the crest of the undulations or corrugations on one or both sides and such known corrugated paperboards are classified as "A" flute, "B" flute or "C" flute, depending on the height and spacing of the flutes. Such heretofore known corrugated paperboard has well-known properties and characteristics and machines have heretofore been devised for manufacture of the same.

It has now been determined that such corrugated medium can be formed as a novel V-shaped flute corrugated medium of planar walls which employs a lesser amount of paperboard medium per unit of lineal length than is required by the undulated corrugated medium presently used, and which has superior factors from the standpoint of load strength, flat crush, or resistance to compression, greater resistance to lateral or edgewise compression, greater tensile strength and substantially greater rigidity than the already existing corrugated cardboard. It is a primary object of the present invention to provide a mechanism which will produce such novel corrugated medium and to this end the present device or variations, thereof, although not limited to such use, has been designed to gather and position a corrugating medium into this sharp crested, even, straight-sided form for transfer into a straight-sided angular tooth roll which is part of a single facer machine which prepares and corrugates the medium and glues a liner to the flute tips on one side of the sharp crested corrugated medium.

The heretofore known and used conventional method of making single faced corrugated board which may or may not subsequently be double faced is to feed paper medium through a single facer machine which first moistens the medium to increase the plastic range between its elastic limit and ultimate strength, which permits a slight stretch and bending without tearing or cracking in the subsequent corrugating operation. After being so moistened, the medium passes between two continuously rotating cylinders or rolls having intermeshing longitudinally contoured teeth to produce undulations in the medium similar to a sine wave. One of the corrugating rolls is journalled in each side frame of the machine in such a manner that no motion is permitted except lateral and rotation about its center axis. This roll serves as the driving roll and ordinarily is larger in diameter than the other and usually not crowned to compensate for deflection. The mating corrugating roll is mounted parallel to the larger roll and is journalled in bell crank-like levers in each side frame so that it can not only rotate about its center axis, but also it can be forced against the large corrugating roll by adjustable fluid pressure cylinders or by adjustable compression springs. The smaller roll is driven by the larger roll and unless a very narrow machine is used, it is always crowned to compensate for deflection due to the pressure forcing the rolls together.

These known corrugating rolls are heated in use, usually by steam, and as the moistened medium passes between the two heated corrugating rolls, the heat and considerable pressure form the paper medium into the sine wave-like flute shape, characteristic of this known type of corrugated paperboard. Suitable moon-shaped metal pieces intermittently spaced across the work face of the large corrugating roll are used to hold the medium in contact with the teeth to maintain proper pitch between the flute tips of the corrugated medium while traveling past an adhesive or glue roll which applies adhesive to these flute tips. The medium is retained in contact with the large corrugating roll tooth surfaces until it passes between this corrugating roll and a steam heated, smooth surface pressure roll, partly around which the incoming liner is wrapped. The liner is thus pressed against the adhesive coated medium flute tips to form a single faced corrugated board in which the liner is glued to the flute tips of the medium. The medium is usually preheated and premoistened and the liner usually preheated and occasionally premoistened before entering the single facer which permits higher operating speeds.

As distinguished from this previously known and used mechanism, the device of the present invention is directed to a mechanism for gathering creased and/or perforated corrugating medium, folding it along the crease to the proper included angle and inserting it into a straight-sided angular tooth roll in which the medium is retained for glue application on the sharp crested flute tips, and in which the medium is still further retained for applying the liner to the flute tips to produce single faced board in a manner similar to the conventional method described above.

The known methods of forming and combining corrugated board are not susceptible to modification in order to provide the advantageous form having sharp crests and straight-sided flutes. The problems presented in adapting known machinery or methods include a tendency for the corrugating medium, especially when perforated, to tear due to the paper being clamped between adjacent teeth in a one stage or one forming step when driving one corrugating roll direct by another. Also tooth forms made to run with sufficient clearance by the use of external minimum backlash gears, did not give entirely satisfactory results. The feed in characteristics do not permit high operating speeds without tearing the medium and the pressure of one corrugating roll against the other mutilates or tears the paper at the flute tips.

As will be understood, if a water-proof medium is used it cannot be moistened to increase its plastic range to permit pressure forming as when making conventional type board. If the sine wave shape medium cannot be formed hot, wet and under pressure, it will not retain its shape when it emerges from the single facer. The device of the present invention has as a very important characteristic, the capability of producing corrugated single faced board with sharp crested, straight-sided flutes with, for example, an included angle of approximately 90°, at high operating speed and including the use of either water-proof medium or plain medium.

An object of the present invention, as will appear hereinafter in detail, is to provide a corrugating apparatus to produce corrugated medium of sharp crested, straight-sided flutes. This is accomplished with the present apparatus partially by the fact that only one toothed roll is required which eliminates the possibility of tearing due to the paper being clamped between adjacent teeth on mating rolls. The feed-in device need not fit closely to the teeth on the tooth roll as the flute is formed before it is inserted in the teeth of the roll. The fact that the medium is shaped before it is inserted in the teeth of the roll, eliminates the possibility of tearing on the sharp teeth of the toothed roll which would occur at high operating speed if two intermeshing toothed rolls were used. The necessity for only a single toothed roll and the shaping of the medium before it is inserted in the teeth of the roll, effectively eliminates the possibility of tearing or mutilating the medium due to pressure of one roll against the other.

The machine of the present invention also results in numerous and additional advantages. Since only a single toothed roll is required, a considerable savings in the cost of the machine results, as the cost of the corrugating rolls represents a large proportion of the cost of the single facer. The smaller of the toothed rolls, which requires crowning, is the most expensive to make and to machine correctly, and with the present mechanism such a roll is not required. Pressure exerting mechanisms, which increase the cost of and the complication of machines, are not required. Since pressure forming and shaping is not required in accordance with the present invention, this results in lighter stresses in the machine with a subsequent substantial reduction in the required driving power for the same average size and speed machine. Additionally, mechanism heretofore used in a two roll single facer of the known type for moving the large corrugating roll laterally occasionally, to prevent the circumferential grooves in the small corrugating roll from embossing the toothed profile of the large roll, is not required.

In accordance with the present invention the teeth of the toothed roll can be straight-sided instead of slightly involute. If two intermeshing toothed rolls were used to produce a sharp crested straight-sided flute, the tooth shape would have to be slightly involute in order to mesh properly and produce the desired flute shape. Such a straight-sided tooth profile simplifies and reduces the cost of machining the toothed roll.

The present device gathers, folds and positions the medium with a smooth continuous motion in such a way that the speed of the paper entering the device is constant and no slack is required in the medium between this device and the feeding rolls which crease and/or perforate the medium at the line which will later be the flute crest. This constant entrance speed of the medium into the device eliminates some of the unsolved problems which have heretofore existed on conventional single facers due to the rapid fluctuations in speed of the medium traveling to the corrugating rolls resulting from the paper medium folding back and forth as it enters between the corrugating rolls. Such folding back and forth can amount to as much as 1,000 times per second when running board at 600 feet per minute which is a conservative speed at the present time. This required high rate of folding speed in conventional single facers can limit the ultimate operating speed, and makes the desired constant back tension on the paper difficult to maintain.

Additional objects, features and advantages of the present invention will be more readily apparent from the following detailed description of embodiments thereof when taken together with the accompanying drawings in which:

FIG. 1 is a schematic view, partly in section, of the mechanisms in accordance with the present invention;

FIG. 1a is a fragmentary perspective view of a single face corrugated board capable of being manufactured with the present mechanisms;

FIG. 2 is an enlarged sectional view of portions of the perforating rolls on the circle indicated and so designated in FIG. 1;

FIG. 3 is an enlarged sectional view of mating portions of a perforating roll and toothed roll on the circle indicated and so designated in FIG. 1;

FIG. 4 is an enlarged view of mating portions of the gathering mechanism and toothed roll for the area in the circle indicated and so designated in FIG. 1;

FIG. 5 is an enlarged view of the encircled area indicated and so designated in FIG. 2;

FIG. 6 is an enlarged fragmentary sectional view taken on line 6—6 of FIG. 2;

FIG. 7 is an enlarged fragmentary sectional view taken on line 7—7 of FIG. 4;

FIG. 8 is an enlarged fragmentary elevational view, partly in section, of a single faced corrugated board susceptible of production in the present apparatus, indicating in broken lines a possible second liner to produce a double faced corrugated board;

FIG. 9 is a fragmentary sectional view taken on line 9—9 of FIG. 8;

FIG. 10 is an enlarged fragmentary view, partly in section, of a modified form of medium gathering pin utilizing a compression spring for actuation;

FIG. 11 is a view similar to FIG. 2 showing a modified form of perforating and creasing rolls;

FIG. 12 is a fragmentary elevational view of another preferred embodiment of material gathering roll;

FIG. 13 is an enlarged fragmentary sectional view taken on line 13—13 of FIG. 12;

FIG. 14 is an enlarged fragmentary sectional view taken on line 14—14 of FIG. 12;

FIG. 15 is a fragmentary enlarged plan view of the gathering roll of FIG. 12 taken on line 15—15, which shows the method of staggering the gathering pins;

FIG. 16 is an enlarged fragmentary view of the area in the circle indicated and so designated in FIG. 12;

FIG. 17 is a sectional view taken on line 17—17 of FIG. 16; and

FIG. 18 is a fragmentary perspective view of a gathering pin utilized in the embodiment of FIG. 12.

Referring now in detail to the drawings and with reference to FIG. 1a, there is shown a fragment of a single faced corrugated board wherein the liner is designated 20 and the corrugated medium broadly designated 22. It will be seen that the corrugated medium consists of a plurality of sharp crests 24 with straight sides 26 which have an included angle of approximately 90°. While the apparatus shown and described herein relates particularly to a single facer machine, manifestly if desired, a second liner can be applied opposite to that shown at 20 to manufacture a double faced board such as schematically indicated in FIG. 8. The second liner 28 in this figure, shown in broken lines, without being glued to the crests, can be applied in any known manner by any known apparatus.

The apparatus of the present invention for producing such corrugated board is shown in a schematic arrangement of components in FIG. 1. Generally the mechanism includes coacting perforating and creasing rolls 30 and 32 between which the traveling web of corrugating medium 34 passes in the direction of the arrow from a source, not shown. The rolls 30 and 32 rotate in opposite directions as indicated by the arrows thereon. The web 34 after passing through the working nip of the coacting rolls 30 and 32 is maintained on the periphery of roll 32 by appropriate guide shoes 36 into working engagement with gathering pins 38 of gathering roll 40 and transferred to the gathering roll 40 by means of a transfer stripper such as indicated at 42. As will appear more clearly hereinafter, the creasing and/or perforating rolls 30 and 32 crease and/or perforate the medium 34 on alternate sides along lines which later will be the flute tips of the corrugated medium. These rolls also perform the function of pulling medium into the single facer from the medium parent roll assisted, if desired or required, by a pair of feed rolls, not shown and delivering or feeding it into the gathering device or roll with a slight bend at the crease line on alternate sides. This results in the medium entering the gathering device with a slight prebend along the lines which will later be the flute tips.

The gathering device broadly includes outside upper and lower semicircular guide shoes 44 and 46 and a gathering roll consisting of a cylindrical hollow roll 48 mounted on shaft 50. Roll 48 is so mounted as to rotate concentrically around shaft 50. Formed integrally or otherwise attached to shaft 50 is a stationary cam 52 having a developed face of a certain character as will appear hereinafter. The cylindrical roll 48 which serves as a spacer roll and pitch changer for a plurality of the pins 38 has a plurality of radial bores 54 extending therethrough. The pins 38 which have outer pointed ends 56 are slidably inserted in these bores 54. As will appear more in detail hereinafter, the spacing of the tips or points of these gathering pins are exactly equal to the distance between alternate crease and/or perforation lines and the pins are adapted for radial movement upon rotation of the roll 48 by coaction with the cammed surface of cam 52 in an obvious manner. The gathering device also is so designed that the radially moving gathering pin tips follow a semi-circle and in so doing gather and cause the creased and/or perforated medium to gradually form into straight-sided corrugations by coaction with the upper guide shoe 44, with the desired included angle, at a place 180° or any other greater or less desired included angle from the location at which the medium 34 enters the gathering device. The roll 48 moves in the direction of the arrow indicated thereon and carries around the web medium 34 as it is being gathered from its point of entry into the work area between rolls 32 and gathering device 40. The material after being gathered into substantially the proper angular disposition and corrugations, is then transferred to toothed transfer roll 58 by means of transfer stripper 60. The teeth 62 on roll 58 are of the same cross-sectional configuration and size as the desired corrugations in the corrugated medium so that the crests fit therein and the so transferred corrugated medium is carried around on the periphery of the transfer roll 58 in coaction with paper guide shoe 64 and 66 to a point where it is taken off roll 58 after having a liner attached thereto. Between section 64 and 66 of paper guide shoe 64, 66 at location 68, a peripheral segment 70 of glue roll 72 extends. Glue roll 72 has a portion thereof immersed in a supply of glue 74 in container reservoir 76 and upon rotation of glue roll 72, glue is carried thereby and applied to the sharp crests 24 on the corrugated medium 22. A glue metering roll 78 coacts with the glue roll 72 in a known manner.

The web of corrugated medium after passing across position 68 and having glue applied thereto, is brought into engagement with a web of liner material 80 fed onto a pressure or compression roll 82 and maintained thereon as pressure roll 82 rotates until it contacts the glued crests 24 of the corrugated medium web 34 at point 86 under pressure to bond the two together under pressure and heat to form the single faced corrugated paperboard as shown in FIG. 1a. Feed of liner 80 is assisted by feed roll 88 which is under spring pressure. Preferably for satisfactory operation, the toothed roll, pressure roll, glue applicator roll, glue metering roll, and the glue reservoir are heated for effective operation.

The so completed single faced corrugated paperboard is then continuously and smoothly taken off of the pressure roll in the direction indicated by arrow 90 to any desired further working station or storage means.

A brush cleaning roll 92 is rotatably mounted for coaction with the teeth of roll 58 to remove therefrom any glue which might become adhered thereto during operation of the apparatus.

Details of the individual components of the apparatus heretofore broadly described will now be described in detail by reference to other figures of the drawings. FIG. 2 shows in detail the construction of features of the perforating and/or creasing rolls 30 and 32. Each of these rolls are provided with spaced longitudinal slots 94 and 96 respectively, and which are staggered as regards the slots on each of the rolls with respect to the other. These rolls are also provided with radial slots 98 and 100 respectively, into each of which, in the embodiment of FIG. 2, a perforating rule or strip is inserted as shown at 102 having pointed ends extending beyond the periphery of the respective rolls, and it will be noted that these radial slots and the perforating rule therein have their respective pointed ends aligned with the slots 94 or 96 of the coacting roll. The height of the points of the perforating rule 102 beyond the peripheries of the rolls is such that when a web of material 34 passes between the rolls, the corrugating material will be perforated completely therethrough and form upstanding or sheared edges indicated at 104 and shown in detail in FIG. 5. These play an important part as regards securement to the liners or facers and the openings provided by the complete through perforating plays an important part from the standpoint of proper glue application necessary to proper adhering of the corrugated medium and the liner. While in some instances, as shown in FIG. 2, both of the rolls carry perforating rule, this in some instances is not desirable. Referring to FIG. 11, a modification is shown wherein coacting rolls 106, 108 are analogous to the rolls 30 and 32. The roll 106 is provided with the longitudinal slots 94 and both rolls are provided with creasing and perforating rule 110 and 112, respectively, arranged in a manner similar to those of FIG. 2. The periphery of roll 108, however, is not provided with longitudinal slots as is the roll 32 but is formed with a plurality of indented corrugations longitudinally extending, as indicated at 114. The perforating rule 112 on roll 108 are again adapted to perforate the corrugating material web but the creasing rule 110 form a plurality of indentations 116 in the web material by coacting with the corrugations 114. It will be noted that the surface of roll 32 is also of a corrugated configuration with the slots 96 at the lower point of the corrugations 118 formed in the surface thereof. As shown in FIG. 2, this permits a bending action to take place on the web of material at the same time that it is being perforated and this action also occurs in the embodiment of FIG. 11.

Any of many types of perforating rule can be used; that is with various type teeth and various tooth spacings. One type is shown in FIG. 6 wherein the perforating rule, generally speaking, is constituted of a blade member 120 having a plurality of sharp teeth 122 thereon in the nature of a saw blade. Preferably however, lance type square cutting surfaces are provided to insure an opening of the perforations with the upstanding edges 104. It will be seen that with this construction with the pointed teeth, and being squared on the transverse sides, and with the teeth extending across substantially the width of the roll, that a plurality of perforations are formed in and completely through a web of material while at the same time providing a slight pre-bend to the web. The perforations and pre-bend serve to facilitate the gathering into the final crested shape as shown in FIGS. 1a and 8.

The gathering roll or gathering device is so designed that the distance between coacting ones of the tips of the radially moving gathering pins are exactly equal to the distance between alternate crease and/or perforation lines. Where the perforated and/or creased web 34 enters into the nip between roll 32 and the gathering device as shown in detail in FIG. 3, the ends of the pins 38 in peripheral rows are radially spaced at the periphery a distance equivalent to three or more flute pitches as prebent and are of a length to penetrate through the perforations a short distance to insure that there will be enough traction without slipping to gather the medium into the desired corrugated shape. This is particularly necessary until the included angle between flute sides decreases to an amount which will produce enough traction. The radially moving gathering pin tips are arranged in a staggered disposition as shown in FIG. 15 of the drawings, so that at the periphery in any plane they are three or more flute pitches apart in order that the ends which follow the stationary cam 52 will not interfere with each other. A possible variation would be to connect the outside pin tips with a continuous horizontal strip across the device with the pins being placed sufficiently apart to satisfactorily serve the same purpose. It will be readily understood that the gathering pins are made to retract and extend radially by this center stationary cam 52 and the outside upper and lower semi-circular guide shoes 44 and 46 respectively. By reference to FIG. 1, it will be seen that the pitch or distance between the ends of the pins decreases as the cylindrical roll 48 rotates counterclockwise from the entry position of the web to the discharge position at the toothed transfer roll 58. In the course of this contraction, the corrugated medium 34 will have reached the necessary configuration. The gathering device is so designed that the radially moving gathering pin tips follow a semi-circle and in so doing gather and cause the creased and/or perforated medium to gradually form into straight-sided corrugations with the desired included angle at a location spaced from where the medium enters the gathering device. The gathering and positioning pins gather and position the medium in a smooth and continuous manner and the speed of entry of the medium into this device is constant and exactly equal to the delivery speed from the creasing and/or perforating rolls and no slack is required between these rolls and the gathering device as will be apparent. The gathering device can easily be synchronized with the creasing and/or perforating rolls and the tooth roll by any appropriate means such as interconnecting with proper ratio gears. This ratio can be changed as desired, if the roll etc. diameters are changed to suit. Means are also provided, not shown, for making minor adjustments of the gathering device, tooth roll, etc. in relation to each other. The gathering device therefore operates to move the gathering pin points on the entering side from a distance exactly equal to the distance between alternate creases and/or perforations to a distance on the discharge side where it is exactly equal to the distance across one tooth at the root of the tooth on the roll 58 which equals one flute when the corrugated medium is wrapped around the toothed roll. The result of this is that the instant velocity of the gathering pin ends in contact with the creasing roll is equal to the peripheral speed of the creasing and/or perforating roll, and the instant velocity of the gathering pin ends in contact with the tooth roll is equal to the peripheral speed of the toothed roll at the root of the teeth. The peripheral speed of the gathering pin points decreases at a uniform rate from the time they are in contact with the creasing and/or perforating roll until they are in contact with the tooth roll. The speed of the pin points then increases at a uniform rate on the return to the starting point. This peripheral speed can, of course, be decreased and increased at a non-uniform rate if desired, by changing the shape of the cam and guide shoe or guide rings to suit.

As stated before, the teeth 62 on toothed transfer roll 58 are formed in the exact configuration to be assumed by the corrugated medium. Referring to FIG. 4 of the drawings, it will be seen that at the root of the teeth there can be formed a groove such as indicated at 124 into which the ends of the pins 38 can extend when the corrugated web is being transferred from the gathering device to the roll 58. This relationship is also apparent from FIG. 7 of the drawings.

In FIG. 10, an alternative construction is shown for the gathering pin operation wherein the roll 48a is again provided with radial grooves in which pins 38a are slidably inserted and at the base thereof, compression springs 126 serve to force the pins radially outward with the limit position thereof being defined by the guide shoe 44a.

Referring to FIGS. 8 and 9 of the drawings, it will be seen that the perforations which extend completely through the corrugated medium 34 permits the application of glue 74 to both sides, that is exterior and interior, of the crest portions of the corrugations. That portion designated 74a which is on the interior of the crest in conjunction with the material on the outer surfaces forms a very strong and rigid bond and adds to the rigidity and strength of the crest and the resultant single or double faced corrugated paperboard. It will also be noted that the edges or burrs 104 serve to strengthen the bond with the glue, with an increased bonding area.

In FIG. 12 and following, another and preferred embodiment of a gathering device is shown in which the travel of the gathering pins or rods is controlled by guide rings. The perforating and creasing roll 32 and the toothed transfer roll 58 are identical in this embodiment. A plurality of guide shoes 128 are spacedly mounted on rods 130 with spacers 132 therebetween. Each of these guide shoes has a groove 134 in the lower end thereof, and it will be noted that the interior surfaces of the shoes are formed as semi-circles commensurate with the circular shape of the gathering roll or gathering device, in a manner similar to the shoe 44 in FIG. 1. A cylindrical roll 136 is mounted for rotation about shaft 138 and having a plurality of radial bores 140 therethrough in a staggered relationship as shown in FIG. 15. The base ends of pins 142 are slidably mounted in these bores and in proximity to their outer ends, the pins 142 have cylindrical pin guides 144 secured thereto. A plurality of circular guide rings 146 in the nature of I-beam configurations are mounted in spaced relationship around the cylinder 136 and are maintained in place by means of wires 148 in grooves 150 formed in the outer surfaces of the guide rings. Tensioning and securing means include shafts 152, 152 grooved at one surface at spaced positions indicated at 154 into which the ends of pins 142 can extend. A plurality of radial bores 156 are provided which are screw-threaded and into which screws 158 are adjustably positioned. The wires 148 extend through diametrical openings 160 in the shaft 152 and are engageable by the screws 158 as shown in FIG. 14 to secure them in position. This permits mounting of the guide rings 146 which otherwise, because of the construction of the machine, would not be possible. It will be noted that spaced coacting ones of the guide rings 146 provide or form guide channels 162 in which the pin guides 144 are slidably mounted. Upon rotation of the cylindrical roll 136 the pins 142 will, by virtue of the guide rings, be radially moved and the points thereof will serve in the same manner upon rotation, to gather the pre-perforated and/or creased and pre-bent corrugating medium in the same manner as in the embodiment of FIG. 1. Transfer strippers 164 extend into the nip between rings 146 and tooth roll 58 as shown in FIGS. 12 and 16.

While specific embodiments of the invention have been shown and described in the application, manifestly minor changes in details thereof can be effected without departing from the spirit and scope of the invention, as defined in and limited solely by the appended claims.

I claim:

1. In a machine for gathering a corrugated web into sharp crested, straight-sided corrugations, web gathering means including a plurality of pins arranged in spaced rows and guide means cooperatively associated with the outer ends of said pins, means for moving said rows of pins successively along said guide means, means for introducing a continuous web having creases in alternate succeeding directions into said gathering means and in confining contact between the outer ends of said gathering pins and said guide means, said pin outer ends in said spaced rows being engageable in alternate ones of said creases and being movable for continuously reducing the distance between said rows from entry point to discharge point of the web for gathering the web by coaction with said guide means into sharp crested, even, straight-sided angularly disposed corrugations.

2. In a machine for gathering a corrugated web into sharp crested, straight-sided corrugations, web gathering means including a hollow rotatable gathering roll having a plurality of spaced radial bores therethrough arranged in a plurality of radially spaced rows, a plurality of gathering pins slidably mounted in said bores, the outer ends of said pins extending outwardly of the periphery of said gathering roll, cylindrical guide means eccentric to said gathering roll and cooperatively associated with said pin outer ends, means for introducing to the gathering means and between said pins and guide means a continuous web having equally spaced transversely extending creases formed therein in alternately opposed directions with the gathering pins engaging alternate ones of said creases, and means for rotating said gathering roll and guiding said pin outer ends in the travel of said pins therewith, whereby the eccentricity between said pin outer ends and guide means causes the distance between said pin outer ends in successive following rows thereof to continuingly reduce from entry point to discharge point of the web thereby gathering the web by coaction with said guide means into sharp crested, even, straight-sided angularly disposed corrugations.

3. In a machine as claimed in claim 2, means for precreasing the web positioned adjacent the entry point of the web to said gathering means.

4. In a machine as claimed in claim 3, said precreasing means additionally including means for perforating said web with spaced perforations along the crease lines formed in the web.

5. In a machine as claimed in claim 4, said precrease and preperforating means including spaced coacting rolls having respectively extending transversely along the peripheries thereof, in alternating arrangement, a plurality of precreasing and perforating members, said members extending beyond the periphery of the respective rolls whereby upon rotation of said rolls web passing therebetween will be precrested and perforated in spaced transversely extending rows of alternately opposed directions.

6. In a machine as claimed in claim 5, the outer ends of said pins engaging through said perforations formed in said alternate ones of said creases at the entry point of said web and through a substantial portion of travel of the web toward the discharge point.

7. In a machine as claimed in claim 2, a tooth roll positioned contiguous to the discharge point of the web from the gathering means, web stripping means interposed between said gathering means and tooth roll for stripping the gathered web from the gathering means and transferring the web to the tooth roll, said tooth roll having a plurality of transversely extending even, straight-sided corrugations on the surface thereof conforming generally with the corrugations in said web as formed by said gathering means.

8. In a machine as claimed in claim 7, a glue applicator roll operatively positioned adjacent said tooth roll and adapted for applying glue to the peaks of the corrugations in the web and through the perforations thereof, whereby glue is positioned externally and internally of each of the peaks in the corrugated web.

9. In a machine as claimed in claim 2, said gathering roll including a central axial mounting shaft about which said gathering roll is rotatably mounted, an eccentric cam member on said shaft of substantially greater diameter than said shaft, the inner ends of said pins being in engagement with the outer surface of said cam whereby upon rotation of said gathering roll said pins by coaction with said cam are extended from or retracted into the bores in said gathering roll and upon such rotation the distance between said rows of pin outer ends is varied by the eccentric relationship of said gathering roll, said cam and said guide means.

10. In a machine as claimed in claim 2, said gathering roll including a central axial mounting shaft about which said gathering roll is rotatably mounted, said guide means comprising a plurality of axially aligned transversely spaced circular guide rings eccentrically disposed with respect to said shaft, adjacent ones of said guide rings forming therebetween pin guide channels, pin guide means secured on said pins in proximity to the outer ends thereof and disposed within said pin guide channels whereby, upon rotation of said gathering roll and pins therewith, said pins by coaction of said pin guides and guide channels are extended from or retracted into the bores in said gathering roll and upon such rotation the distance between said rows of pin outer ends is continuingly varied by the eccentric relationship of said gathering roll and said guide channels.

11. In a machine as claimed in claim 2, said radial bores mounting said pins arranged in said radially spaced rows being staggered with relation to succeeding contiguous pins whereby spaced ones of said pins constitute said rows and prevent interference between the inner ends of said pins as the distance between said pin outer ends in successive following rows thereof is decreased.

12. A method for corrugating a continuously travelling web of material, comprising creasing said material along spaced transverse substantially parallel succeeding lines, and bent slightly in alternately opposed directions, engaging the ends of a plurality of transversely spaced pins arranged in spaced rows in alternate ones of the creases on one side of the travelling web, and subsequently continuously reducing the distance between the ends of the pins in the rows while confining the other side of the web to thereby gradually gather the web progressively into sharp crested, even, straight-sided corrugations.

13. A method as claimed in claim 12, including perforating said material along at least some of said crease lines and inserting the ends of the pins into the perforations at least at the start of the gathering action for positive engagement with the web.

References Cited in the file of this patent

UNITED STATES PATENTS

| | | |
|---|---|---|
| 931,755 | Gribbel et al. | Aug. 24, 1909 |
| 1,282,360 | Atherton | Oct. 22, 1918 |
| 1,944,280 | Snyder | Jan. 23, 1934 |
| 2,020,639 | Grayson et al. | Nov. 12, 1935 |
| 2,310,154 | Schlenker | Feb. 2, 1943 |
| 2,503,874 | Ives | Apr. 11, 1950 |
| 2,695,910 | Frederick | Aug. 10, 1954 |
| 2,837,788 | Mazzocco | June 10, 1958 |
| 3,044,921 | Wentworth et al. | July 17, 1962 |